(12) United States Patent
Ericson et al.

(10) Patent No.: US 8,015,227 B2
(45) Date of Patent: Sep. 6, 2011

(54) METHOD IN CREATING A SYMBOL PATTERN, SYMBOL PATTERN OBTAINED THEREBY, METHOD AND SYSTEM FOR FINDING A POSITION IN SUCH SYMBOL PATTERN AND COMPUTER PROGRAM PRODUCT FOR PERFORMING THE METHOD

(75) Inventors: Petter Ericson, Malmö (SE); Andreas Björklund, Lund (SE)

(73) Assignee: Anoto AB (SE)

( * ) Notice: Subject to any disclaimer, the term of this patent is extended or adjusted under 35 U.S.C. 154(b) by 1294 days.

(21) Appl. No.: 11/630,086

(22) PCT Filed: Jul. 5, 2005

(86) PCT No.: PCT/SE2005/001108
§ 371 (c)(1),
(2), (4) Date: Dec. 20, 2006

(87) PCT Pub. No.: WO2006/006922
PCT Pub. Date: Jan. 19, 2006

(65) Prior Publication Data
US 2007/0299896 A1    Dec. 27, 2007

Related U.S. Application Data

(60) Provisional application No. 60/585,856, filed on Jul. 8, 2004.

(30) Foreign Application Priority Data

Jul. 8, 2004 (SE) ........................... 0401812

(51) Int. Cl.
*G06F 7/00* (2006.01)

(52) U.S. Cl. ...................................................... 708/492
(58) Field of Classification Search ........... 708/491–492
See application file for complete search history.

(56) References Cited

U.S. PATENT DOCUMENTS
6,038,577 A * 3/2000 Burshtein ..................... 708/252
(Continued)

FOREIGN PATENT DOCUMENTS
EP        1 416 433 A2    5/2004
(Continued)

OTHER PUBLICATIONS

Lidl et al., Chapter 6, Linear Recurring Sequences, pp. 189-249.

*Primary Examiner* — Tan V Mai
(74) *Attorney, Agent, or Firm* — Finnegan, Henderson, Farabow, Garrett & Dunner, LLP

(57) ABSTRACT

The invention relates to a method in creating a two-dimensional symbol pattern which may be utilized to determine a position in a large area covered by the pattern, for example for recording handwritten information by means of a pen-like instrument. The invention is useful for creating a symbol pattern having desired properties, namely that any sufficiently large observed part of the pattern is unique, enabling an unambiguous determination of position. The symbol pattern is based on a non-repeating sequence of symbol values $S_k$ that each corresponds to a fixed linear combination of the coefficients of the monomials in $x^k \mod P(x)$, where $P(x)$ is any polynomial of degree n in the field $F_q$. The symbol pattern is generated by folding the sequence according to a wrapping scheme. The invention also relates to methods and systems for finding the position of a group of observed symbol values in this symbol pattern and computer program products performing the methods.

40 Claims, 2 Drawing Sheets

U.S. PATENT DOCUMENTS

| | | | |
|---|---|---|---|
| 7,116,840 B2 * | 10/2006 | Wang et al. | 382/291 |
| 7,133,563 B2 * | 11/2006 | Wang et al. | 382/240 |
| 7,430,497 B2 * | 9/2008 | Wang et al. | 703/2 |
| 7,486,822 B2 * | 2/2009 | Wang et al. | 382/182 |
| 2004/0085287 A1 | 5/2004 | Wang et al. | |
| 2004/0085302 A1 | 5/2004 | Wang et al. | |
| 2004/0086181 A1 | 5/2004 | Wang et al. | |
| 2004/0086191 A1 | 5/2004 | Wang et al. | |
| 2005/0013369 A1 * | 1/2005 | Lee | 375/240.16 |

FOREIGN PATENT DOCUMENTS

| | | | |
|---|---|---|---|
| EP | 1 416 435 A2 | 5/2004 | |

* cited by examiner

METHOD IN CREATING A SYMBOL PATTERN, SYMBOL PATTERN OBTAINED THEREBY, METHOD AND SYSTEM FOR FINDING A POSITION IN SUCH SYMBOL PATTERN AND COMPUTER PROGRAM PRODUCT FOR PERFORMING THE METHOD

CROSS-REFERENCE TO RELATED APPLICATIONS

The present application claims the benefit of Swedish patent application No. 0401812-3 and U.S. provisional patent application No. 60/585,856, which were both filed on Jul. 8, 2004 and which are hereby incorporated by reference.

FIELD OF THE INVENTION

The present invention relates to a method in creating a two-dimensional symbol pattern which may be utilized to determine a position in a large area covered by the pattern, for example for recording handwritten information by means of a pen-like instrument. The invention is useful for creating a symbol pattern having desired properties enabling an unambiguous determination of position.

The invention also relates to methods and systems for finding the position of a group of observed symbol values in this symbol pattern and computer program products performing the methods.

STATE OF THE ART

In this field it is previously known to form patterns which may be scanned into a pen-like instrument incorporating memory and computer power for calculating the position of the pen relative to the pattern, e.g. printed on a paper or displayed on a computer screen.

It is also known to generate repeating or non-repeating sequences by means of linear feedback shift registers (LFSR). A non-repeating sequence has the property that each sub-sequence of a given number of consecutive values only occurs once in the sequence. Thus, in a non-repeating sequence the place of each sub-sequence of a given length is unambiguously determined. It is known to wrap or fold such a non-repeating sequence to a two-dimensional symbol pattern and finding a location in such a pattern. See for example published patent applications US 2004/0085287, US 2004/0085302, US 2004/0086181, and US 2004/0086191, all assigned to Microsoft Corporation.

SUMMARY OF THE INVENTION

The problem with the wrapped sequences in the prior art is that there is no way of telling if such a two-dimensional pattern, obtained by wrapping a non-repeating sequence, has the desired properties, namely that any sufficiently large observed part of the pattern is unique. If it is not unique is it not possible to determine its location without ambiguity.

The present invention provides tools for formulating a condition governing the relationship between an observed group (mask) in the symbol pattern and a valid non-repeating sequence. Furthermore, the present invention provides efficient techniques to test whether a wrapped sequence has adequate properties for position determination, as well as to recover a position within the symbol pattern.

The invention is defined in the attached claims.

BRIEF DESCRIPTION OF THE DRAWINGS

The invention will be described in detail below with reference to the accompanying drawings in which.

DETAILED DESCRIPTION OF PREFERRED EMBODIMENTS

For a better understanding, we describe the mathematics behind the invention, of which some also forms part of the prior art. The following terms and definitions will be used.

TERMS AND DEFINITIONS

Figure 1:
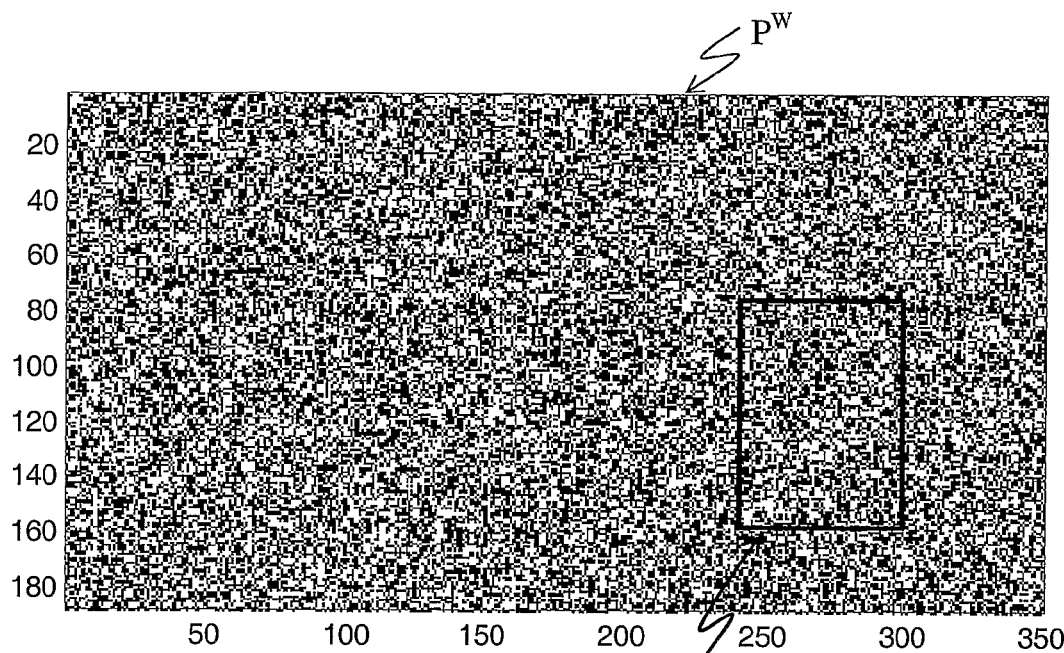
FIG. 1 is an example of a wrapped sequence embodied as a symbol pattern.

S sequence of elements $S_k$
L length of S (k=0 to L−1),
$P^W$ symbol pattern formed by sequence S and wrapping scheme W
P(x) polynomial of degree n
n degree of polynomial P(x) and size of LFSR
N rank of T
$r_k$ residual polynomial of degree n, and defined as $r_k \equiv x^k$ (mod P(x)) counting in $F_q[x]/P(x)$;
$F_q$ finite field of order q, where typically, but not necessarily, q=2
G(f(x)) auxiliary function, e.g. coefficient of the monomial $x^{n-1}$ in $r_k$
W wrapping scheme
w wrap length (when wrapping rowwise or columnwise)
B mask=column vector of elements observed by means of a geometrical scan pattern (=ball)
B' ditto, with another scan pattern
$B^P$ subdivision of symbol pattern
m size of B (="k×1", if rectangular scan pattern); (m≧n)
C column vector of coefficients (of size n) of the residual polynomial $r_k$ corresponding to a location k in the sequence S
T transform matrix T, fulfilling B=TC, T has rank N=n
T' transform matrix T', fulfilling B=T'C, T has rank N=n−j
X,Y sought position (e.g. top left corner or "first" element of B if B is of irregular shape)
$B_{X,Y}$ elements of B (and B') at sought position (X,Y)
$C_{X,Y}$ coefficients in C corresponding to sought position (X,Y)
k location in the sequence S where the coefficients in C equal $C_{X,Y}$
H check matrix fulfilling HT=0, and with unique non-zero columns
$h_i$ column i of H, a syndrome of a bit error occurring at bit i of B
LFSR linear feedback shift register The first task is to create a symbol pattern $P^W$ having desired properties. This may be done by forming and wrapping a long non-repeating sequence S and then checking that the transform relationship represented by the transform matrix T between a sufficiently large observed mask and the sequence fulfils a stipulated condition. An example of a symbol pattern is shown in FIG. 1, in which white and black pixels represent symbol values 1 and 0, respectively. Thus, the symbol pattern is made up of an ordered set of symbols that each represents at least one symbol value or element of the sequence S.

Although the following discussion is based upon the sequence S being made up of binary symbol values, the underlying principles of the invention are generally applicable to symbol values in any base (i.e. for any order q of the field $F_q$).

Figure 2:
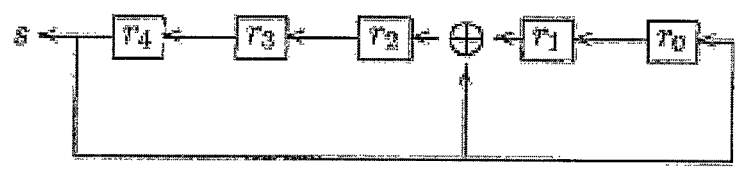
FIG. 2 is a schematic illustration of a linear feedback shift register.

It is well known that a linear feedback shift register LFSR can be used to produce long non-repeating binary sequences such that any large enough subsequence is unique within the sequence. An n-size LFSR is a simple computational device consisting of n bit holders labelled $r_0, r_1, \ldots, r_{n-1}$, connected along a closed directed circuit, and at least one XOR-gate, for example as shown in FIG. 2. The device is updated at discrete times $t_0, t_1 \ldots$ At time $t_k$, k>0, every bit holder is simultaneously updated with the value calculated at the end of the arrow pointing to it. The contents $C_k=(c_0^{(k)}, c_1^{(k)}, \ldots, c_{n-1}^{(k)})$ at time $t_k$ is called the state of the LFSR at time $t_k$. At time $t_0$, the state is e.g. $\{1, 0, 0, \ldots, 0\}$. At each time $t_k$, the bit contained in $r_{n-1}$ is shifted out to produce the kith bit of the binary sequence S. The generated sequence S may have a period of at most $2^n-1$ since there are this many unique states, and indeed, for some LFSR:s the period of the sequence is this long. Another property which is desirable for the purposes of the present invention is that any subsequence of n consecutive bits in the period is unique.

In the example of FIG. 2, the LFSR includes five bit holders and an XOR gate. The illustrated LFSR represents the polynomial $P(x)=x^5+x^2+1$ and may generate a non-repeating sequence of a certain length depending on P(x) and the initial values of the bit holders. More details on LFSR:s and generation of repeating and non-repeating sequences are, i.a., found in "Introduction to finite fields and their applications", Chapter 6—Linear Recurring Sequences, by R. Lidl and H. Niederreiter, Revised Edition 1994, Cambridge University Press.

The LFSR is a practical device for generating the sequence. Fortunately, the LFSR also admits a natural mathematical treatment in terms of generators in polynomial rings, which we describe next.

Let $F_2$ be the binary field. Let $F_2[x]$ be the field of all polynomials in x with coefficients from $F_2$. Finally, let R(x, P(x)) for a polynomial P(x) in $F_2[x]$ denote the ring consisting of the elements $x^k$ for k=0, 1, 2, . . . in $F_2[x]/P(x)$, i.e. $x^k$ modulo P(x), where each monomial coefficient is in $F_2$. The smallest positive o such that $x^o-1$ is dividable by P(x) in $F_2[x]$ is called the order of the ring.

The ring R(x,P(x)) is related to a LFSR in the following way. Let n be the degree of P(x), and consider an n-size LFSR with XOR gates between $c_{L-1}$ and $c_L$ for each monomial $x^L$ in p(x). Now observe that the state $C_k=(c_0^{(k)}, c_1^{(k)}, \ldots, c_{n-1}^{(k)})$ of the LFSR at time $t_k$ obeys $$\sum_{j=0}^{n-1} c_j^{(k)} x^j \equiv x^k (\bmod P(x))$$

since multiplication by x corresponds to a shift of the LFSR, and subtraction to give the remainder after division by P(x) corresponds to the XOR gates' calculation. Stated otherwise, the state of the LFSR can be uniquely identified with an element of R(x,P(x)). Thus, the period of the LFSR generated sequence equals the order of R(x,P(x)). Especially, LFSR:s corresponding to a primitive polynomial of degree n in $F_2[x]$ generate periodic sequences of period $2^{n-1}$ such that all possible 0/1-strings of length n except the all-zero string occur once (and only once) in the sequence.

For convenience, we introduce some auxiliary notation. Let $$r_k(x) = \sum_{j=0}^{n-1} c_j^{(k)} x^j$$

and for any polynomial $f(x)$, let $G(f(x))$ be 1 if the monomial $x^{n-1}$ is part of the residue polynomial $f(x)$ mod P(x), and 0 otherwise.

Equipped with our observations so far, we are ready to establish a connection between the k:th bit $S_k$ of the LFSR generated sequence S, and the state of the LFSR any time in the past.

Fact 1: The k:th bit $S_k$ of the LFSR generated sequence S obeys $S_k=G(r_{k-\Delta t}(x) x^{\Delta t})$, for any $\Delta t \geq 0$.

Given an n-size LFSR sequence S, we want to characterize when the pattern $P^W$ obtained by wrapping S row-wise each w:th symbol, gets the property that any large enough submatrix is unique in $P^W$. Formally, the entry $P^W(X,Y)$ at row Y and column X in the pattern is given by: $P^W(X,Y)=S_{Yw+X}$.

We want to relate the LFSR state $C_k$ to the a×b-submatrix in $P^W$ with top left corner in (X,Y) with k=Yw+X. The above Fact 1 lets us do just that:

$$P^w(X+u, Y+v) = G(r_k(x) x^{vw+u})$$

Since $G(f(x))$ is a linear function, we may put the equation above in matrix form as:

$$\begin{pmatrix} P^w(X, Y) \\ P^w(X+1, Y) \\ M \\ P^w(X+b-1, Y) \\ P^w(X, Y+1) \\ M \\ P^w(X+b-1, Y+a-1) \end{pmatrix} =$$

$$\begin{pmatrix} G(x^0) & & G(x^{n-1}) \\ G(x^1) & & G(x^n) \\ & & \\ G(x^{b-1}) & \Lambda & G(x^{b+n-2}) \\ G(x^w) & & G(x^{w+n-1}) \\ & & \\ G(x^{w(a-1)+b-1}) & & G(x^{w(a-1)+b+n-2}) \end{pmatrix} \begin{pmatrix} c_0^{(k)} \\ c_1^{(k)} \\ M \\ c_{n-1}^{(k)} \end{pmatrix}$$

For brevity, let us write this relation as B=TC, where B is the pattern submatrix vector, T is the linear transform from LFSR state to pattern submatrix, and C is the LFSR state vector. We postulate our main theorem:

Theorem: Let P(x) in $F_2[x]$ be a polynomial of degree n. Let L be the order of R(x,P(x)). Then, the pattern $P^W$ obtained from the sequence S of length L generated by the LFSR for R(x,P(x)), has the property that any a x b-submatrix in $P^W$ is unique if the corresponding T has rank n over $F_2$. Furthermore, this is also a necessary requirement when the order is maximal ($L=2^n-1$).

The pattern $P^W$ described above was obtained by wrapping the sequence S row-wise each w:th symbol. Alternatively, other embeddings or wrapping schemes of the sequence may be used to form a two-dimensional pattern, e.g. column-wise wrapping each w:th symbol, or diagonal embedding of the sequence. Still other embeddings may do, but preferably the difference between the indices of the sequence elements at adjacent positions is constant. To clarify, for each position (X,Y) in the pattern, we have associated a unique location k in the sequence S, which we may denote by q(X,Y)=k, meaning that the symbol value $S_k$ is at position (X,Y) in the pattern. Now, if q(X+1,Y)−q(X,Y) mod L, and q(X,Y+1)−q(X,Y) mod L are constant, regardless of the choice of position (X,Y), distinct advantages may be obtained with the present invention, as will be clarified further on.

Furthermore, the inventive techniques admit not only the wrapping scheme to be altered, but may also be used to investigate uniqueness and handle position decoding of arbitrary shapes of a group of symbols/symbol values as opposed to merely a rectangle as above. We will in the following give an example of a pattern in which groups of symbol values in the shape of a small ball are unique, and the wrapping scheme includes columnwise wrapping.

Consider the following polynomial:

$$P(x)=x^{16}+x^{15}+x^{13}+x^{10}+x^8+x^7+x^5+x^4+x^3+x+1$$

and define the vector:

$$r_k = x^k \pmod{P(x)}$$

counting in $F_2[x]/P(x)$.

Since P(x) is a primitive polynomial, the first k>0 for which $r_k=r_0$ is $k=2^{16}-1$.

We consider the pattern obtained by wrapping the sequence $G(r_k)$ for k=0, 1, 2, . . . , $2^{16}-2$, where $G(f(x))$ for any polynomial $f(x)$ is the (binary) coefficient of the monomial $x^{15}$ in $f(x)$ mod P(x). Generally, $G(f(x))$ may be any linear combination of the coefficients of the monomials in $f(x)$ mod P(x).

An example of a symbol pattern $P^W$ is shown in FIG. 1 where white and black pixels represent symbol values 1 and 0, respectively. The sequence starts in the upper left corner and runs downwards, wrapping each 187 bit, starting from the top again, in the next column to the right of the previous one. The choice of the sequence, i.e. P(x) and the wrap length 187 is not arbitrary. On the contrary, they are chosen with great care in order to obtain some desirable decoding properties.

Firstly, we want to ensure that every large enough area of the pattern is unique within the pattern, and admits fast inversion, i.e. a fast algorithm locating the coordinates within the pattern of the seen area.

Secondly, we would prefer an error resistant embedding, i.e. an ability to calculate the coordinates of a seen portion of bits also in the presence of a few erroneously interpreted bits.

Figure 3:
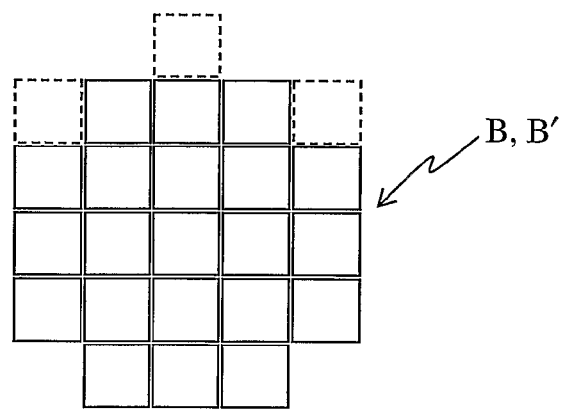
FIG. 3 is a schematic illustration of an exemplary mask defining an observed subset of the symbol pattern.

An example of a group of symbol values (in the following called mask or ball B) is shown in FIG. 3. The symbol pattern given above has the following properties:

1. Any group of symbol values, e.g. of the shape in FIG. 3, is unique within the pattern, i.e. if we see a ball anywhere in the pattern, we are able to tell where the seen ball is located in the pattern. Furthermore, it is possible to do this much faster than searching through the complete pattern for a match, and still using significantly less storage than employing a large lookup-table containing all possible ball-to-position pairs.

2. If at most one of the 21 symbol values (bits) in a ball seen anywhere in the pattern is erroneously interpreted or missing, we can detect this and calculate its proper value fast. Note that this requires that any two different balls in the pattern must differ in at least three symbol values.

How was the choice of P(x) in combination with wrap length 187 verified to have these properties? This was accomplished by relating $r_k$, accounting for the (imaginary) top left corner $G(r_k)$ of the ball (position (X,Y)), to the seen bits of the ball. Note that the bits of the ball may be written in terms of $r_k$ as shown in the table below.

| $G(r_k)$ | $B_0=$ | $B_1=$ | $B_2=$ | | |
|---|---|---|---|---|---|
| | $G(r_{k+w})$ | $G(r_{k+2w})$ | $G(r_{k+3w})$ | | |
| $B_3=$ | $B_4=$ | $B_5=$ | $B_6=$ | $B_7=$ | |
| $G(r_{k+1})$ | $G(r_{k+w+1})$ | $G(r_{k+2w+1})$ | $G(r_{k+3w+1})$ | $G(r_{k+4w+1})$ | |
| $B_8=$ | $B_9=$ | $B_{10}=$ | $B_{11}=$ | $B_{12}=$ | |
| $G(r_{k+2})$ | $G(r_{k+w+2})$ | $G(r_{k+2w+2})$ | $G(r_{k+3w+2})$ | $G(r_{k+4w+2})$ | |
| $B_{13}=$ | $B_{14}=$ | $B_{15}=$ | $B_{16}=$ | $B_{17}=$ | |
| $G(r_{k+3})$ | $G(r_{k+w+3})$ | $G(r_{k+2w+3})$ | $G(r_{k+3w+3})$ | $G(r_{k+4w+3})$ | |
| | $B_{18}=$ | $B_{19}=$ | $B_{20}=$ | | |
| | $G(r_{k+w+4})$ | $G(r_{k+2w+4})$ | $G(r_{k+3w+4})$ | | |

By observing that $G(r_{k+1})$ may be expressed as a linear combination of the coefficients $c_i$ of the monomials in $$r_k = \sum_{i=0}^{15} c_i x^i$$

we may write the relation as B=TC, representing $$\begin{pmatrix} B_0 \\ B_1 \\ M \\ B_{20} \end{pmatrix} = \begin{pmatrix} G(x^w) & G(x^{w+1}) & \Lambda & G(x^{w+15}) \\ G(x^{2w}) & G(x^{2w+1}) & \Lambda & G(x^{2w+15}) \\ M & M & O & M \\ G(x^{3w+4}) & G(x^{3w+5}) & \Lambda & G(x^{3w+19}) \end{pmatrix} \begin{pmatrix} c_0 \\ c_1 \\ M \\ c_{15} \end{pmatrix}$$

according to the mathematical discussion above. Here B corresponds to the observed elements of the pattern $P^W$, and C corresponds to the residual polynomial $r_k$. Note that in a valid sequence S, T is only dependent on the sequence S, the wrapping scheme W and the shape of the mask B. Since the residual polynomial $r_k$ (i.e. $x^k$ mod P(x)), and thereby the coefficients C, can be calculated using ~log(k) multiplications by repeated squaring using the recurrence relations:

$$x^{2k}=(x^k)^2 \text{ and } x^{2k+1}=x^*x^{2k}$$

the transform matrix T can be efficiently calculated. In the present example, the main theorem (above) stipulates that we need the matrix to have rank 16 in order to obtain unique fast invertible balls. For w=187, the matrix T looks like

```
0 1 0 1 1 1 1 1 1 1 0 0 1 0 1 1
0 1 1 1 1 1 1 0 0 1 1 1 1 1 0 0
1 1 1 1 1 0 0 1 0 0 1 0 1 1 1 1
0 0 0 0 0 0 0 0 0 0 0 0 0 0 1 1
1 0 1 1 1 1 1 1 1 0 0 1 0 1 1 1
1 1 1 1 1 1 0 0 1 1 1 1 1 0 0 0
1 1 1 1 0 0 1 0 0 1 0 1 1 1 1 0
1 0 1 1 0 0 1 1 0 0 0 0 1 1 1 1
0 0 0 0 0 0 0 0 0 0 0 0 0 1 1 1
0 1 1 1 1 1 1 1 0 0 1 0 1 1 1 0
1 1 1 1 1 0 0 1 1 1 1 1 0 0 0 1
1 1 1 0 0 1 0 0 1 0 1 1 1 1 0 0
0 1 1 0 0 1 1 0 0 0 0 1 1 1 1 1
0 0 0 0 0 0 0 0 0 0 0 1 1 1 0
1 1 1 1 1 1 1 0 0 1 0 1 1 1 0 1
1 1 1 1 0 0 1 1 1 1 1 0 0 0 1 0
1 1 0 0 1 0 0 1 0 1 1 1 1 0 0 0
1 1 0 0 1 1 0 0 0 0 1 1 1 1 1 0
1 1 1 1 1 1 0 0 1 0 1 1 1 0 1 1
1 1 1 0 0 1 1 1 1 1 0 0 0 1 0 0
1 0 0 1 0 0 1 0 1 1 1 1 0 0 0 1
``` which indeed has rank 16 over $F_2$.

For forming a valid sequence S the following steps may be performed:

Select that the sequence S is binary, that is the field q=2.
Select a suitable polynomial P(x), for example with a degree of n=16.
Select a wrapping scheme W, e.g. column-wise wrapping with a wrap length w=187. It is also possible to wrap row-wise or diagonally. For diagonal wrapping, it may be desirable for the largest common divisor between width and height of the pattern to be 1. In principle, however, the only requirement on the wrapping scheme is that it maintains the relative geometrical order and relationship between elements in the mask B and corresponding coefficients C of the sequence S.
Select a mask pattern B with a specific shape and a number of bits m, for example m=21.
Calculate the transform matrix T using the wrapping scheme W, the shape of the mask B, and the polynomial P(x).
Check that the rank N of T=n. If so, the symbol pattern $P^W$, i.e. the sequence S wrapped with the wrapping scheme W, has the desired properties. If not, vary one or more of the wrapping scheme W, the shape of the mask B, and the polynomial P(x) until the rank N of T=n.

The transform matrix T is suitably calculated by repeated squaring.

It is also possible to form a subdivision of the symbol pattern $P^W$, for instance a subdivision $B^P$, as shown in FIG. 1. This is useful when it is desired to produce an area covered by part of the symbol pattern $P^W$, for example by printing on a sheet of paper. The first element of $B^P$ at position (X,Y) is generated by calculating $r_k \equiv x^k$ (mod P(x)), suitably by repeated squaring, and then evaluating $G(r_k)$ to get the symbol value, for k=q(X,Y). To get the next element to the right, we may use the fact that q(X+1,Y)−q(X,Y)=d is constant, which means we can multiply $r_k$ by $x^d$ to get $r_{k+d}$, and we may calculate $G(r_{k+d})$ to obtain the symbol value. Thus, moving to the next symbol to the right is simple when generating a portion of the pattern. Generally, given the residual polynomial $r_k$ for a position (X,Y), generating the element at position (X+u,Y+v) is performed by multiplying $r_k$ by a power of x corresponding to the vector (u,v), and then applying the function G.

As mentioned by way of introduction, one use of the symbol pattern may be to determine the position of a detection device moved over a displayed pattern, e.g. on paper or a computer screen. For example, Applicant's U.S. Pat. No. 6,674,427 and No. 6,667,695, which are incorporated herein by this reference, further describe handheld pen-like devices for position determination. These pen-like devices can be used for position determination according to the present invention if programmed in a suitable way.

In the following, one embodiment of such a detection device will be described with reference to FIG. 4. The detection device 400 of this embodiment comprises a pen-shaped casing or shell 401 that defines a window or opening 402, through which images are captured by a capturing means 403 which is configured to scan a number of the symbols of the pattern.

The capturing means 403 may include any kind of sensor that is suitable for imaging the symbol pattern so that an image of the symbols is obtained in black and white, in grey scale or in color. Such a sensor can be a solid-state single- or multi-chip device which is sensitive to electromagnetic radiation in any suitable wavelength range. For example, the sensor may include a CCD element, a CMOS element, or a CID element (Charge Injection Device). Alternatively, the sensor may include a magnetic sensor array for detection of a magnetic property of the symbols. Still further, the sensor may be designed to form an image of any chemical, acoustic, capacitive or inductive property of the symbols.

Figure 4:
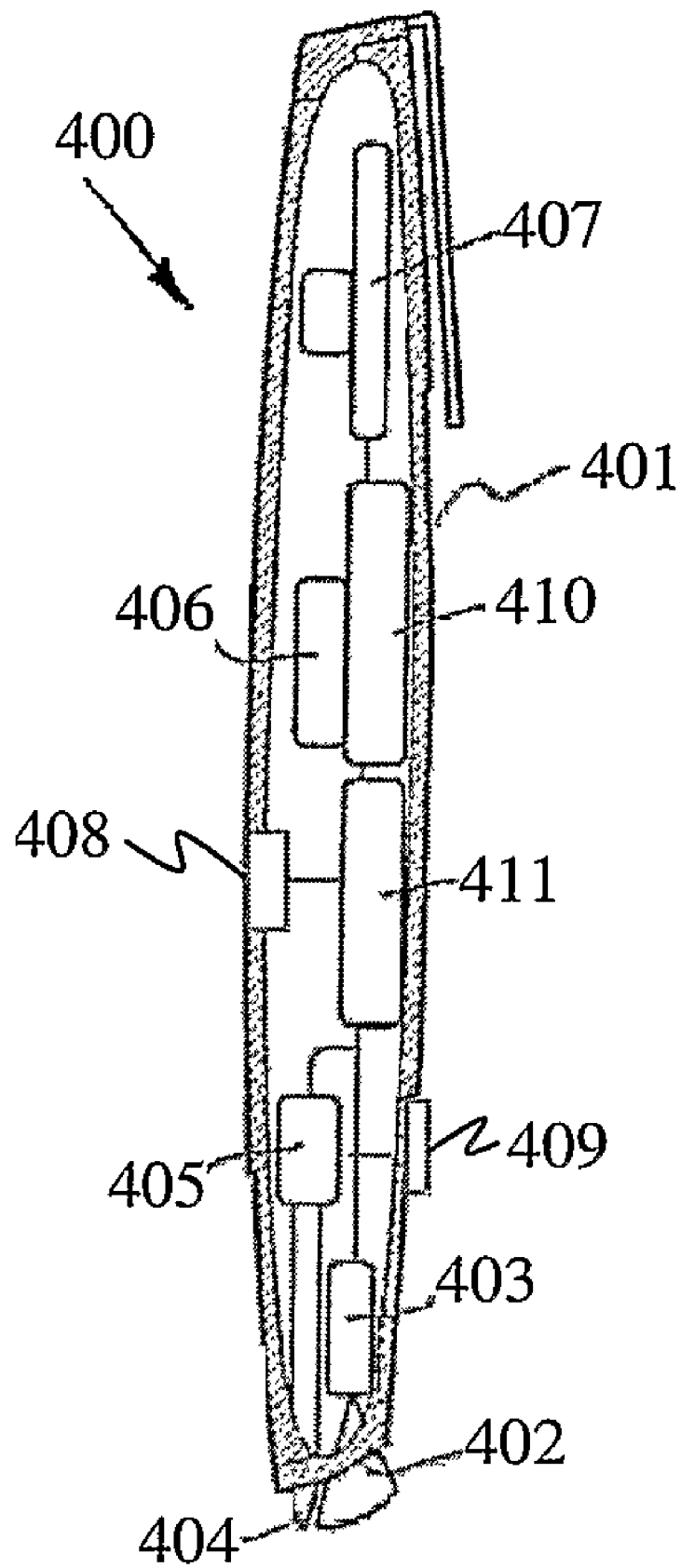
FIG. 4 is a schematic side view, partly in section, of a pen-shaped detection device according to an embodiment of the invention.

The detection device 400 of FIG. 4 also comprises a pen point or writing implement 404 which allows the user to point the detection device 400 to a specific location on the symbol pattern, and which optionally deposits ordinary pigment-based marking ink on the symbol pattern so that the user can see what he is writing or drawing on the symbol pattern. A contact sensor 405 is operatively connected to the pen point 404 to detect when it is applied to and/or lifted from a surface. Based on the output of the contact sensor 405, the capturing means 403 is controlled to capture, between a pen down and a pen up, images of an area near or around the pen point 401. The detection device 400 also comprises a power supply 406 such as a battery and/or a mains power connector, a communications interface 407 comprising components for wired or wireless short-range or remote communication, an MMI (Man Machine Interface) 408 such as a display, an indicator lamp, a vibrator, or a speaker for providing feedback to the user, and one or more buttons 409 allowing the user to activate and/or control the detection device 400.

The detection device 400 also contains a memory 410 for storing pattern data representing the symbols scanned by the capturing means 403, and a signal-processing arrangement 411 for performing various calculations. The signal-processing arrangement 411 may e.g. be realized by a suitably programmed processor, by specifically adapted hardware, such as an ASIC (Application-Specific Integrated Circuit), a DSP ("Digital Signal Processor") or an FPGA (Field Programmable Gate Array), by discrete digital or analog components, or any combination thereof. Alternatively, the memory 410 and/or the signal-processing arrangement 411 may be located in an external receiving unit (not shown) in communication with the detection device 400.

The calculations made by the signal processing arrangement 411 will now be briefly explained with reference to the exemplifying mask of FIG. 3. As discussed above, the symbols scanned by the capturing means 403 are disposed in a known geometrical order and relationship relative to the sequence. We assume that the mask B is located at the position defined by the coordinates (X,Y) of the top left corner of the mask B. The observed symbols within the mask B represent symbol values, i.e. elements in the sequence S. These observed elements $B_{X,Y}$ of the mask B correspond to specific coefficients $C_{X,Y}$ of the sequence S. The relationship between the elements $B_{X,Y}$ and $C_{X,Y}$ is expressed in the matrix equation B=TC.

Finding the location of an observed mask B in the symbol pattern $P^W$ may comprise the following steps. First, the elements $B_{X,Y}$ of the mask B at position (X,Y) are captured and stored in memory. Then, the matrix equation $B_{X,Y}=TC_{X,Y}$ is solved for $C_{X,Y}$.

In one embodiment, the transform matrix T (suitably as a factorization allowing for quick solving), or its inverse $T^{-1}$, is pre-calculated for the sequence S and may be stored in the memory of the detection device/receiving unit. Also, the mask B may have a predetermined fixed shape. For successive locations at varying positions (X,Y), the corresponding coefficients $C_{X,Y}$ are solved with the aforesaid matrix equation.

The coefficients $C_{X,Y}$ correspond to one and only one location k in the sequence S. Once the coefficients $C_{X,Y}$ are found, k is calculated, e.g. by means of the Silver-Pohlig-Hellman algorithm. The Silver-Pohlig-Hellman scheme finds the discrete logarithm k for which $r_k \equiv x^k \pmod{P(x)}$ has the coefficients $C_{X,Y}$.

Since the order of P(x) is $2^{16}-1=3*5*17*257$, and the Silver-Pohlig-Hellman algorithm is efficient whenever the largest prime of the order (in this case 257) is small enough, fast determination of k is possible.

From k the (X,Y)-coordinates of the ball's top left corner are given by (k div w, k mod w) with the column-wise wrap length of w=187.

In another embodiment, the shape of the mask B' may be varied. For instance, the mask B' may incorporate the three elements shown with dashed lines in FIG. 3. The number m of elements may be made constant by excluding three other elements or may be increased by incorporating more elements. This may be useful when the values of the decoded symbols are uncertain. Then, various shapes of the mask B' may be tried until a valid transform matrix T is found. In this case, the transform matrix T, or its inverse $T^{-1}$, may be dynamically calculated in the detection device/receiving unit. A valid transform matrix T may be defined as having a rank N=n. Then, the matrix equation B'=TC may be solved and the location found as defined above.

The following decoding strategy may be used. Sort the interpreted symbol values according to degree of certainty, i.e., starting with the symbols whose interpretation the image processing is most certain about. Then add the symbol values one by one until the linear transform matrix gets rank n, and solve for the position. Note that any shape of the mask may be used, not only rectangles or balls of adjacent elements.

In a still further embodiment, a valid transform matrix T' is defined as having a rank N=n−j. In this case, the matrix equation B=T'C will have maximum of $2^j$ solutions corresponding to different positions (X,Y) and locations k in the sequence S. Of course, only one solution is the correct one, and false solutions may be eliminated by overlying heuristics. For instance, false solutions may be eliminated by checking the continuity conditions (e.g. spatial distance, acceleration, etc) with respect to one or more preceding and/or succeeding positions.

It is possible to let both the mask B' be varied and a valid transform matrix T' be defined as having a rank N=n−j. First, various shapes of the mask B' may be tried until a valid transform matrix T' is found. Then the matrix equation B'=T'C with the various solutions may be solved and the false solutions eliminated.

The present invention also provides tools for performing error correction of the sampled observed bits. The null space of $T^t$ (T transposed) can be evaluated by known techniques to obtain a binary matrix H with linearly independent rows fulfilling HT=0.

In the present example, H is a 5×21 matrix and $H=[h_1\ h_2\ h_3\ \ldots\ h_{21}]$ is $$\begin{array}{c}
1\ 0\ 0\ 0\ 0\ 0\ 1\ 1\ 1\ 1\ 1\ 0\ 1\ 0\ 1\ 0\ 0\ 0\ 0\ 0\ 0 \\
1\ 0\ 1\ 1\ 1\ 1\ 0\ 0\ 0\ 1\ 1\ 0\ 1\ 1\ 0\ 0\ 1\ 1\ 0\ 0\ 0 \\
0\ 0\ 1\ 1\ 0\ 1\ 1\ 1\ 1\ 0\ 0\ 1\ 1\ 0\ 0\ 1\ 1\ 0\ 1\ 0\ 0 \\
0\ 1\ 1\ 1\ 1\ 0\ 0\ 1\ 0\ 0\ 1\ 0\ 1\ 0\ 0\ 1\ 0\ 0\ 0\ 1\ 0 \\
1\ 1\ 1\ 0\ 0\ 0\ 1\ 0\ 0\ 0\ 0\ 1\ 1\ 1\ 0\ 1\ 1\ 0\ 0\ 0\ 1
\end{array}$$

Such a matrix H is known as the check matrix in the context of Error Correcting Codes of the linear code generated by T. Note that our H has the property that all columns $h_i$ are different from the all-zero vector and unique. Since all possible observed masks B in the pattern are on the format B=TC for some choice of coefficient vector C, a seen mask with an erroneous bit at i may be written $B^*=B+e_i$, with $e_i$ being a column vector having value one (1) in bit position i and value zero (0) in all other positions. Multiplication with the check matrix yields:

$$HB^* = HB + He_i = H(TC) + He_i = (HT)C + He_i = 0 + He_i = h_i$$

This means we are able to find and correct a single error by multiplying the seen mask by H and looking up the obtained string to find the location of the error. Inverting the erroneous bit gives us the correct value, and we may solve for C using Gaussian elimination and backward substitution via T, e.g. with the Silver-Pohlig-Hellman algorithm as before.

The above error correction works equally well with a check matrix H' associated with a transform matrix T' having rank N=n−j (that is H'T'=0).

If we would like to find a pattern where we could allow v bits to be erroneous, we need to find a check matrix H with the property that any 2v columns are linearly independent. This is well-known from the theory of linear codes.

When the detection device is moved over a surface with the symbol pattern, for example for forming characters and images, a sequence of decoding or position finding operations is performed. There, each position may be decoded as discussed above, with a fixed or variable mask B, B' and with a transform matrix T, T' having rank N=n or N=n−j. The decoding scheme may also vary between positions.

The invention may be implemented with various combinations of software and hardware as will be appreciated by a person skilled in the art. The scope of the invention is only limited by the claims below.

The invention claimed is:

1. A computer-implemented method in creating a two-dimensional symbol pattern $P^W$ having the property that any subset of symbol values observed in the symbol pattern and having the size m is unique, comprising:
   generating, by using a processor, a non-repeating sequence S of symbol values $S_k$ that each corresponds to a fixed linear combination of coefficients C of monomials in $x^k$ mod P(x), where P(x) is any polynomial of degree n in field $F_q$;

generating, by using the processor, a mask vector B comprising m symbol values based on a mask pattern with a defined shape;
storing, in a memory device, the mask vector B; and
defining, by using the processor, a wrapping scheme W for folding the sequence into said two-dimensional symbol pattern $P^W$, wherein said polynomial P(x), said mask pattern, and said wrapping scheme W are defined such that a transform matrix T that fulfils the matrix equation B=TC has a rank N=n over $F_q$.

2. The method in creating a symbol pattern according to claim 1, wherein said wrapping scheme W is defined to maintain the relative geometrical order and relationship between symbol values in the mask pattern and said coefficients C.

3. The method in creating a symbol pattern according to claim 1, wherein $S_k$=Gf(x)), and G(f(x)) for any polynomial f(x) is the coefficient of the monomial $x^{n-1}$ in f(x) mod P(x).

4. The method in creating a symbol pattern according to claim 1, wherein the transform matrix T is calculated by repeated squaring.

5. The method in creating a symbol pattern according to claim 1, wherein the wrapping scheme W consists of wrapping the sequence S in rows (or columns) with a wrap length w.

6. The method in creating a symbol pattern according to claim 1, wherein the wrapping scheme W consists of wrapping the sequence S diagonally.

7. The method in creating a symbol pattern according to claim 1, wherein said coefficients C represent the state of a linear feedback shift register, LFSR, having the size n, with bit holders for $x^{n-1}$ to 1.

8. The method in creating a symbol pattern according to claim 1, wherein said wrapping scheme W is defined such that [q(X+1,Y)−q(X,Y)] mod L and [q(X,Y+1)−q(X,Y)] mod L are constant for any position (X,Y) in the symbol pattern $P^W$, with q(X,Y)=k being the relationship between a position (X,Y) in the symbol pattern $P^W$ and a location k in the sequence S, and L being the length of the sequence S.

9. A computer-implemented method of finding a position (X,Y) of a mask B observed in a two-dimensional symbol pattern $P^W$ having the property that any mask B with a defined shape and a size of at least m symbol values is unique, the symbol pattern being based on a non-repeating sequence S of symbol values $S_k$ that each corresponds to a fixed linear combination of coefficients C of monomials in $x^k$ mod P(x), where P(x) is any polynomial of degree n in field $F_q$, and the symbol pattern $P^W$ being formed by folding said sequence S according to a wrapping scheme W, said method comprising:
retrieving, from a memory device, information about a relationship between the symbol values in the mask B and the corresponding coefficients C;
extracting, by using a processor, the symbol values of said mask B at said position (X,Y);
calculating, by using the processor, the corresponding coefficients $C_{X,Y}$ from $B_{X,Y}$ by means of said relationship, where $B_{X,Y}$ are the extracted symbol values of B at said position (X,Y);
determining, by using the processor, a location k in the sequence S where the coefficients C equal $C_{X,Y}$; and
calculating, by using the processor, said position (X,Y) in the symbol pattern $P^W$ based on the location k and the wrapping scheme W.

10. The method of finding a position according to claim 9, wherein said relationship is a transform matrix T that fulfils the matrix equation B=TC and has a rank N=n over $F_q$.

11. The method of finding a position according to claim 10, further comprising: for error correction, forming a check matrix H by solving the equation HT=0; forming $HB_{X,Y}=h_i$; and if $h_i=0$ maintaining $B_{X,Y}$, but if $h_i\neq 0$, changing the symbol value at position i of $B_{X,Y}$.

12. The method of finding a position according to claim 10, further comprising:
calculating a candidate transform matrix T for each of a set of shapes of the mask B until the thus-calculated candidate transform matrix T has a rank N=n over $F_q$; and
selecting the thus-calculated candidate transform matrix T for use in calculating the corresponding coefficients $C_{X,Y}$ with $B_{X,Y}=TC_{X,Y}$.

13. The method of finding a position according to claim 9, wherein said relationship is a transform matrix T' that fulfils the matrix equation B=T'C and has a rank N=n−j over $F_q$, and wherein said method further comprises:
calculating a plurality of solutions for the corresponding coefficients $C_{X,Y}$ with $B_{X,Y}=T'C_{X,Y}$;
calculating a plurality of candidate locations k in the sequence S where the coefficients of C equal $C_{X,Y}$;
calculating a plurality of candidate positions (X,Y) in the symbol pattern $P^W$ based on the locations k and the wrapping scheme W; and
eliminating false candidate positions of the sought position.

14. The method of finding a position according to claim 13, wherein the false candidate positions are eliminated by checking continuity conditions.

15. The method of finding a position according to claim 13, further comprising:
for error correction, forming a check matrix H' by solving the equation H'T'=0; forming $H'B_{X,Y}=h_i$; and if $h_i=0$ maintaining $B_{X,Y}$, but if $h_i\neq 0$, changing the symbol value at position i of $B_{X,Y}$.

16. The method of finding a position according to claim 13, further comprising:
calculating a candidate transform matrix T' for each of a set of shapes of the mask B until the thus-calculated candidate transform matrix T' has a rank N=n−j over $F_q$; and
selecting the thus-calculated candidate transform matrix T' for use in calculating the corresponding coefficients $C_{X,Y}$ with $B_{X,Y}=T'C_{X,Y}$.

17. The method of finding a position according to claim 16, wherein the number m of symbol values in the mask B is successively increased within said set of shapes.

18. The method of finding a position according to claim 17, wherein the number m of symbol values in the mask B is successively increased within said set of shapes.

19. The method of finding a position according to claim 9, wherein the wrapping scheme W comprises folding the sequence S in columns with a wrap length w, and wherein the position (X,Y) is calculated as (k div w, k mod w).

20. The method of finding a position according to claim 9, wherein the location k in the sequence S where the coefficients C equal $C_{X,Y}$ is calculated with an algorithm for finding the discrete logarithm of k for which $r_k=x^k \pmod{P(x)}$ has the coefficients $C_{X,Y}$.

21. The method of finding a position according to claim 9, which is repeated for a number of different positions of the mask B.

22. The method of finding a position according to claim 21, wherein the shape of the mask B and said relationship are maintained fixed.

23. A computer-implemented method of calculating a symbol value $S_k$ in a non-repeating sequence S of symbol values that each corresponds to a fixed linear combination G of coefficients C of monomials in $x^k$ mod P(x), where P(x) is any polynomial of degree n in field $F_q$, comprising:

calculating, by using a processor, $r_k \equiv x^k \pmod{P(x)}$ by repeated squaring;

deriving, by using the processor, the symbol value $S_k$ from $G(r_k)$; and storing, in a memory device, the symbol value $S_k$.

24. The method of calculating a symbol value according to claim 23, wherein the squaring uses the recurrence relations $x^{2k} = (x^k)^2$ and $x^{2k+1} = x \cdot x^{2k}$.

25. A computer-implemented method of calculating a subdivision $B^P$ of a symbol pattern $P^W$ having the property that any mask B with a defined shape and a size of at least m symbol values is unique, the symbol pattern being based on a non-repeating sequence S of symbol values $S_k$ that each corresponds to a fixed linear combination of coefficients of monomials in $x^k \bmod P(x)$, where $P(x)$ is any polynomial of degree n in field $F_q$, and the symbol pattern $P^W$ being formed by folding said sequence S according to a wrapping scheme W, said subdivision $B^P$ representing a set of positions in the symbol pattern $P^W$, said method comprising:

retrieving, from a memory device, said set of positions;

based on the wrapping scheme W, converting, by using a processor, at least one of said positions to a location k in the sequence S; and calculating, by using the processor, the symbol value $S_k$ for said location k with the method according to claim 23.

26. The method of calculating a subdivision according to claim 25, wherein said wrapping scheme W is defined such that $[q(X+1,Y)-q(X,Y)] \bmod L = d_1$ and $[q(X,Y+1)-q(X,Y)] \bmod L = d_2$ are constant for any position (X,Y) in the symbol pattern $P^W$, with $q(X,Y)=k$ being the relationship between a position (X,Y) in the symbol pattern $P^W$ and a location k in the sequence S, and L being the length of the sequence S, said method further comprising:

for at least one another position which is displaced from said at least one position by a displacement vector (u,v), calculating $x^p \cdot r_k$, with p being a linear combination of $d_1$ and $d_2$ which is representative of said displacement vector (u,v); and deriving a symbol value for said at least one another position from $G(x^p \cdot r_k)$.

27. The method of calculating a subdivision according to claim 25, wherein the subdivision $B^P$ of the pattern $P^W$ is adapted to cover an area to be printed.

28. A system for finding a position (X,Y) of a mask B observed in a two-dimensional symbol pattern $P^W$ having the property that any mask B with a defined shape and a size of at least m symbol values is unique, the symbol pattern being based on a non-repeating sequence S of symbol values $S_k$ that each corresponds to a fixed linear combination of coefficients C of monomials in $x^k \bmod P(x)$, where $P(x)$ is any polynomial of degree n in field $F_q$, and the symbol pattern $P_W$ being formed by folding said sequence S according to a wrapping scheme W, said system comprising:

a memory device for storing information about a relationship between the symbol values in B and the corresponding coefficients C; and a processor for:

extracting, from the memory device, the symbol values of said mask B at said position (X,Y);

calculating the corresponding coefficients $C_{X,Y}$ from $B_{X,Y}$ based on said relationship, where $B_{X,Y}$ are the extracted symbol values of B at said position (X,Y);

calculating the location k in the sequence S where the coefficients C equal $C_{X,Y}$; and calculating said position (X,Y) in the symbol pattern $P^W$ based on the location k and the wrapping scheme W.

29. The system for finding a position according to claim 28, wherein said relationship is a transform matrix T that fulfils the matrix equation $B=TC$ and has rank $N=n$ over $F_q$.

30. The system for finding a position according to claim 29, further comprising an error correction processor to:

form a check matrix H by solving the equation $HT=0$;

form $HB_{X,Y}=h_i$; and if $h_i=0$ maintain $B_{X,Y}$, but if $h_i \neq 0$, change the symbol value at position i of $B_{X,Y}$.

31. The system for finding a position according to claim 29, wherein the processor:

calculates a candidate transform matrix T for each of a set of shapes of the mask B until the thus-calculated candidate transform matrix T has a rank $N=n$ over $F_q$; and selects the thus-calculated candidate transform matrix T for use in calculating the corresponding coefficients $C_{X,Y}$ with $B_{X,Y}=TC_{X,Y}$.

32. The system for finding a position according to claim 31, wherein the processor successively increases the number m of symbol values in the mask B within said set of shapes.

33. The system for finding a position according to claim 28, wherein said relationship is a transform matrix T' that fulfils the matrix equation $B=T'C$ and has rank $N=n-j$ over $F_q$, and wherein said processor:

calculates a plurality of solutions for the corresponding coefficients $C_{X,Y}$ with $B_{X,Y}=T'C_{X,Y}$;

calculates a plurality of locations k in the sequence S where the coefficients C equal $C_{X,Y}$;

calculates a plurality of candidate positions (X,Y) in the symbol pattern $P^W$ based on the locations k and the wrapping scheme W; and eliminates false candidate positions of the sought position.

34. The system for finding a position according to claim 33, wherein the false candidate positions are eliminated by checking continuity conditions.

35. The system for finding a position according to claim 33, further comprising an error correction processor to:

form a check matrix H' by solving the equation $H'T'=0$;

form $HB_{X,Y}=h_i$; and if $h_i=0$ maintain $B_{X,Y}$, but if $h_i \neq 0$, change the symbol value at position i of $B_{X,Y}$.

36. The system for finding a position according to claim 33, wherein the processor:

calculates a candidate transform matrix T' for each of a set of shapes of the mask B until the thus-calculated candidate transform matrix T' has a rank $N=n-j$ over $F_q$; and selects the thus-calculated candidate transform matrix T' for use in calculating the corresponding coefficients $C_{X,Y}$ with $B_{X,Y}=T'C_{X,Y}$.

37. The system for finding a position according to claim 36, wherein the processor successively increases the number m of symbol values in the mask B within said set of shapes.

38. The system for finding a position according to claim 28, which is operated repeatedly for a number of different positions of the mask B.

39. The system for finding a position according to claim 38, wherein the processor maintains the shape of the mask B and the relationship.

40. The system for finding a position according to claim 28, wherein the processor calculates the location k in the sequence S where the coefficients C equal $C_{X,Y}$ with an algorithm for finding the discrete logarithm of k for which $r_k \equiv x^k \pmod{P(x)}$ has the coefficients of $C_{X,Y}$.

* * * * *